United States Patent
Cobb et al.

(10) Patent No.: US 8,285,046 B2
(45) Date of Patent: Oct. 9, 2012

(54) ADAPTIVE UPDATE OF BACKGROUND PIXEL THRESHOLDS USING SUDDEN ILLUMINATION CHANGE DETECTION

(75) Inventors: Wesley Kenneth Cobb, Woodlands, TX (US); Kishor Adinath Saitwal, Houston, TX (US); Bobby Ernest Blythe, Houston, TX (US); Tao Yang, Katy, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 775 days.

(21) Appl. No.: 12/388,409

(22) Filed: Feb. 18, 2009

(65) Prior Publication Data

US 2010/0208986 A1 Aug. 19, 2010

(51) Int. Cl.
*G06K 9/34* (2006.01)
(52) U.S. Cl. .................................................... 382/173
(58) Field of Classification Search .............. 382/103, 382/162–167, 173, 181, 190, 209, 218–221, 382/224–225, 232, 236, 270–275, 276, 278, 382/291, 312; 348/220.1, 224, 370–371, 348/394.1, 400.1–402.1, 409.1–418.1; 358/453, 358/464; 375/240.12, 240.13, 240.16
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,124,740 A * | 6/1992 | Wheeler | 396/62 |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |

(Continued)

FOREIGN PATENT DOCUMENTS

WO 2009049314 A2 4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Jose Couso
(74) *Attorney, Agent, or Firm* — Patterson & Sheridan LLP

(57) ABSTRACT

Techniques are disclosed for a computer vision engine to update both a background model and thresholds used to classify pixels as depicting scene foreground or background in response to detecting that a sudden illumination changes has occurred in a sequence of video frames. The threshold values may be used to specify how much pixel a given pixel may differ from corresponding values in the background model before being classified as depicting foreground. When a sudden illumination change is detected, the values for pixels affected by sudden illumination change may be used to update the value in the background image to reflect the value for that pixel following the sudden illumination change as well as update the threshold for classifying that pixel as depicting foreground/background in subsequent frames of video.

24 Claims, 7 Drawing Sheets

U.S. PATENT DOCUMENTS

| | | | |
|---|---|---|---|
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,724,952 B2 * | 5/2010 | Shum et al. | 382/173 |
| 7,808,532 B2 * | 10/2010 | Sun et al. | 348/224.1 |
| 7,825,954 B2 | 11/2010 | Zhang et al. | |
| 7,868,912 B2 | 1/2011 | Venetianer et al. | |
| 8,041,116 B2 * | 10/2011 | Eaton et al. | 382/173 |
| 8,064,695 B2 * | 11/2011 | Eaton et al. | 382/173 |
| 8,094,493 B2 * | 1/2012 | Hsieh et al. | 365/185.03 |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0138338 A1 | 6/2006 | Tezuka et al. | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0250898 A1 | 10/2007 | Scanlon et al. | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2010/0150471 A1 | 6/2010 | Cobb et al. | |
| 2010/0322516 A1 | 12/2010 | Xu et al. | |

OTHER PUBLICATIONS

Helmut Grabner et al., "On-line Boosting and Vision," IEEE Conference on Computer Vision and Pattern Recognition (CVPR), Jun. 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, Jun. 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, Dec. 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

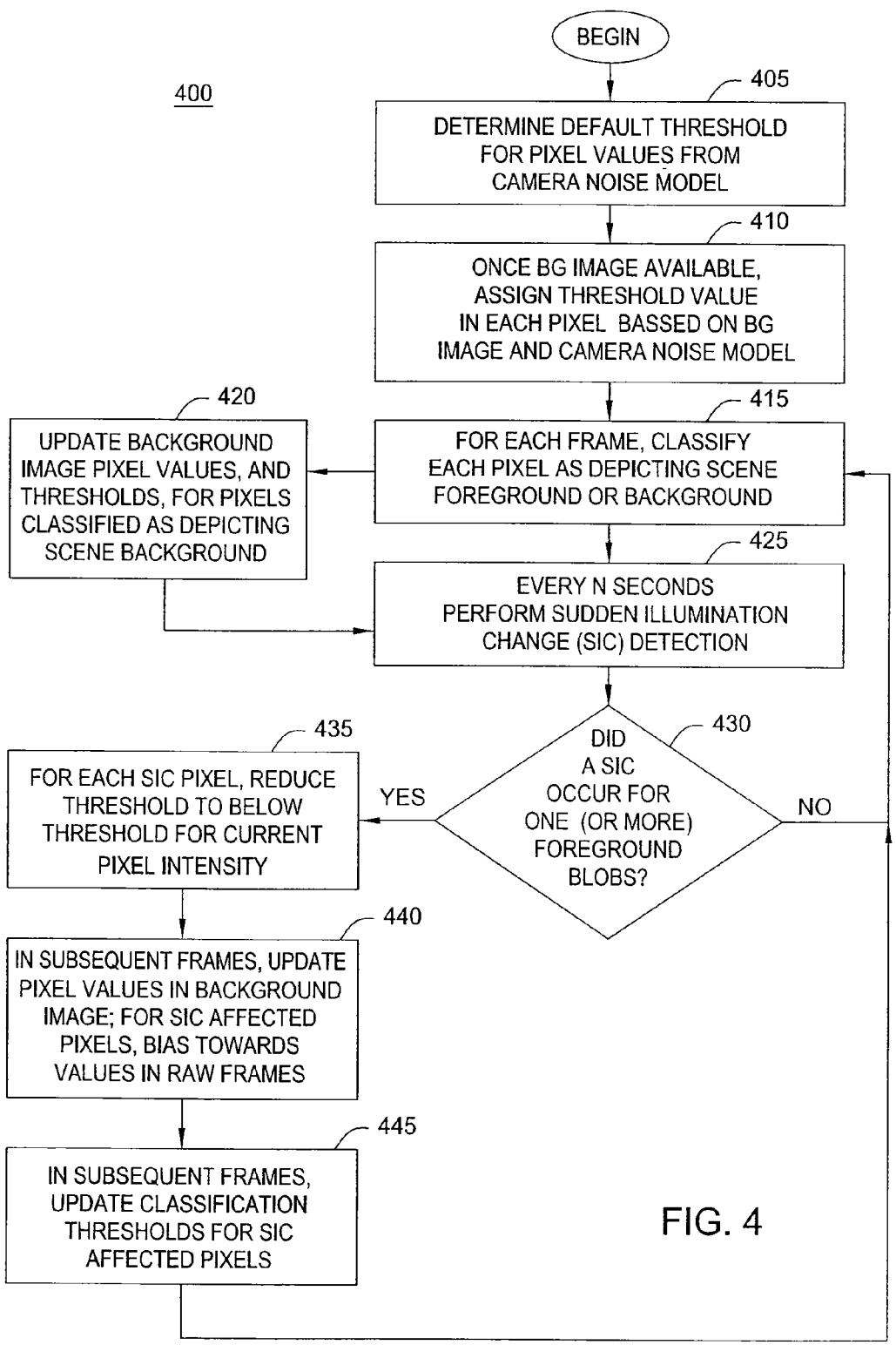

ADAPTIVE UPDATE OF BACKGROUND PIXEL THRESHOLDS USING SUDDEN ILLUMINATION CHANGE DETECTION

CROSS-REFERENCE TO RELATED APPLICATIONS

This application is related to commonly owned, co-pending U.S. patent application Ser. No. 12/336,382, entitled "Hierarchical Sudden Illumination Change Detection Using Radiance Consistency within A Spatial Neighborhood," filed Dec. 16, 2008, which is incorporated by reference in its entirety.

BACKGROUND OF THE INVENTION

1. Field of the Invention

Embodiments of the invention provide techniques for computationally analyzing a sequence of video frames. More specifically, embodiments of the invention relate to techniques for an adaptive update of background pixel thresholds in response to detecting a sudden illumination change.

2. Description of the Related Art

Some currently available video surveillance systems provide simple object recognition capabilities. For example, some currently available systems are configured to identify and track objects moving within a sequence of video frame using a frame-by-frame analysis. These systems may be configured to isolate foreground elements of a scene from background elements of the scene (i.e., for identifying portions of a scene that depict activity (e.g., people, vehicles, etc.) and portions that depict fixed elements of the scene (e.g., a road surface or a subway platform). Thus, the scene background essentially provides a stage upon which activity occurs. Some video surveillance systems determine the difference between scene background by generating a model background image believed to provide the appropriate pixel color, grayscale, and/or intensity values for each pixel in an image of the scene. Further, in such systems, if a pixel value in a given frame differs significantly from the background model, then that pixel may be classified as depicting scene foreground. Contiguous regions of the scene (i.e., groups of adjacent pixels) that contain a portion of scene foreground (referred to as a foreground "blob") are identified, and a given "blob" may be matched from frame-to-frame as depicting the same object. That is, a "blob" may be tracked as it moves from frame-to-frame within the scene. Thus, once identified, a "blob" may be tracked from frame-to-frame in order to follow the movement of the "blob" over time, e.g., a person walking across the field of vision of a video surveillance camera.

Further, such systems may be able to determine when an object has engaged in certain predefined behaviors. However, such surveillance systems typically require that the objects and/or behaviors which may be recognized by the system to be defined in advance. Thus, in practice, these systems simply compare recorded video to predefined definitions for objects and/or behaviors. In other words, unless the underlying system includes a description of a particular object or behavior, the system may not recognize that behavior (or at least instances of the pattern describing the particular object or behavior). Thus, to recognize additional objects or behaviors, separate software products may need to be developed. This results in surveillance systems with recognition capabilities that are labor intensive and prohibitively costly to maintain or adapt for different specialized applications. Further still, such systems are often unable to associate related aspects from different patterns of observed behavior. As a result, by restricting the range of objects that a system may recognize using a predefined set of patterns, many available video surveillance systems have been of limited usefulness.

SUMMARY OF THE INVENTION

Embodiments of the invention relate to techniques for an adaptive update of background pixel thresholds in response to detecting a sudden illumination change.

One embodiment of the invention includes a computer implemented method for analyzing a sequence of video frames depicting a scene captured by a video camera. The method may generally include classifying each of a plurality of pixels in a first frame of the sequence of video frames as depicting one of scene background and scene foreground. The pixels may be classified based on a comparison of (i) a relative deviation determined using a pixel value from the first frame and a corresponding pixel value in a background image and (ii) a classification threshold assigned to each pixel in the background image. The classification thresholds may be based on a measure of expected camera noise relative to pixel intensity. Upon determining that a group of pixels in the first frame were classified as depicting scene foreground as a result of a sudden illumination change (SIC), the pixels affected by the sudden illumination change may be re-classified as depicting scene background. Additionally, the classification threshold for such pixels may be reduced to a value below the relative deviation determined for the pixels. Ensuring these pixels are classified as depicting scene background in subsequent frames. Following the sudden illumination change, for one or more successive frames of video following the first frame, the pixel values in the background image (and the classification thresholds) may be updated based on pixel values obtained from video frames following the first frame. For example, at each frame, the pixel values in the background image may be biased towards a new average (obtained from a number of frames following the sudden illumination change) and the classification threshold may be increased by a small amount (e.g., by adding a percentage of a maximum threshold for a given intensity to the current threshold). Over a number of frames, therefore, the pixel values in the background image stabilize while the classification threshold us increased until reaching the appropriate values for the stabilized pixel values in the background image (based on the intensity of the pixels following the sudden illumination change and the camera noise model).

In a particular embodiment, the step of classifying each of the plurality of pixels in the first frame of the sequence of video frames as depicting one of scene background and scene foreground may include determining the relative deviation as $\rho_R$, $\rho_G$, and $\rho_B$ between a first pixel in the first frame and the corresponding pixel in the background image according to:

$$\rho_R = \frac{255}{|R - \overline{R}| + 1}$$

$$\rho_G = \frac{255}{|G - \overline{G}| + 1}$$

$$\rho_B = \frac{255}{|B - \overline{B}| + 1}$$

wherein R, G, and B represent a color channel value for the first pixel in the first frame and wherein $\overline{R}$, $\overline{G}$, and $\overline{B}$ each represent a corresponding pixel color channel value from the background image. And also include determining an overall relative difference (Δ) from the $\rho_R$, $\rho_G$, and $\rho_B$ values. Once determined, the first pixel is classified as depicting scene background when the overall relative difference (Δ) is above or equal to the threshold assigned to the first pixel unclassified as depicting scene foreground when the overall relative difference (Δ) is below the threshold assigned to the first pixel. Further, the overall relative difference (Δ) for the first pixel is calculated from the $\rho_R$, $\rho_G$, and $\rho_B$ values according to:

$$\Delta = \frac{1}{2}\{\rho_R + \rho_G + \rho_B - \text{minimum}(\rho_R, \rho_G, \rho_B)\}.$$

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates a method for updating pixel background pixel thresholds after a sudden illumination change is detected, according to one embodiment of the invention.

DETAILED DESCRIPTION OF THE PREFERRED EMBODIMENTS

Figure 1:
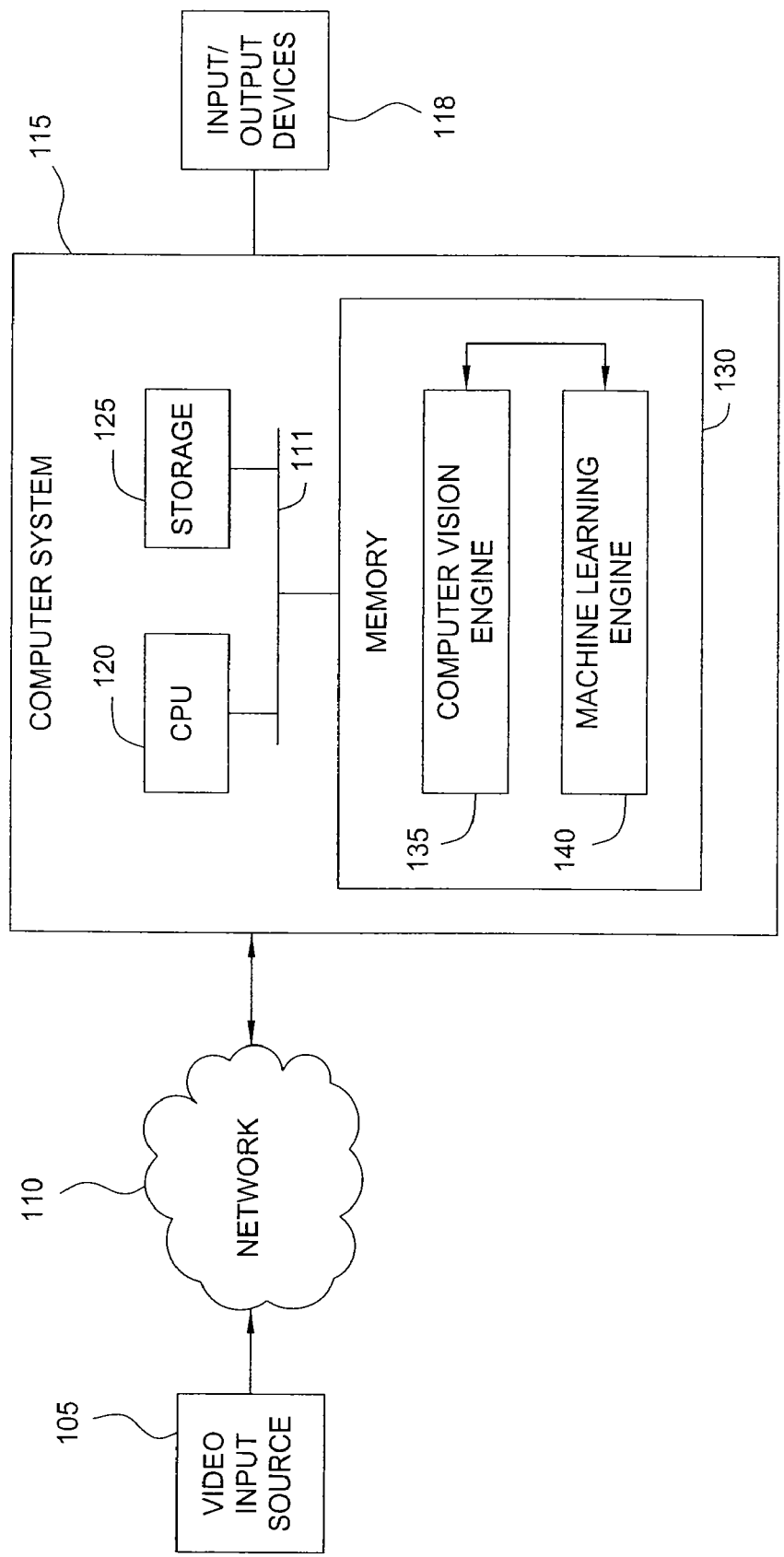
FIG. 1 illustrates components of a behavior recognition system, according to one embodiment of the present invention.

A behavior-recognition system may be configured to identify, learn, and recognize patterns of behavior by observing events captured by a sequence of video frames. The behavior-recognition system may include both a computer vision engine and a machine learning engine. The computer vision engine may be configured to receive and evaluate a stream of individual video frames. Each frame may include data representing the color, grayscale, and/or intensity values for each pixel in the frame. For example, a frame of video may be characterized using multiple color channels (e.g., a radiance value between 0-255 and a set of red, green, and blue (RGB) color channels values, each between 0-255). In one embodiment, the computer vision engine may generate a background image by observing the scene over a number of video frames.

For example, consider a video camera trained on a stretch of a highway. In such a case, the background would include the roadway surface, the medians, any guard rails or other safety devices, and traffic control devices, etc. Vehicles traveling on the roadway (and any other person or thing engaging in some activity) would represent scene foreground objects. The computer vision engine could observe such a scene and, over time, develop a model or image of what the scene looks like in the absence of any foreground objects (i.e., an image of the highway without any vehicles or other activity). Thus, the background image represents the static, relatively permanent elements of a scene being observed by a video camera. The background model may include, for each pixel in the frame, a pixel value representing what value is expected to be obtained when the scene background is visible to the camera. The pixel values may be determined as an average of a given pixel over multiple frames.

In one embodiment, a threshold may be used to classify a pixel in a current frame as depicting scene foreground or background. For example, if the difference between a pixel value in the current frame and the corresponding pixel value in the background model exceeds (or falls below) the threshold, then that pixel is classified as depicting scene foreground. Further, the particular threshold may depend on the expected camera noise and the particular intensity (or color values) of the pixel in the background image. That is, the thresholds for a pixel value may depend on the value of that pixel in the background model. This occurs as pixel values tend to be more noisy in lower lighting situations (i.e., pixels tend to exhibit more change in frame-to-frame even when no change has actually accrued in the scene). Thus, a greater threshold is needed for pixels with a lower radiance than for more pixels depicting more brightly lit elements of a scene.

By using the background image to separate scene foreground from background, the computer vision engine identifies when a foreground object enters (or appears) in the scene. For example, as a vehicle enters the field-of-vision of the camera, a pixel value depicting a part of the vehicle may be sufficiently different from the corresponding pixel in the background image for the computer vision engine to conclude that the background represented by that pixel has been occluded by a foreground object (namely, the vehicle). As the vehicle occludes more and more pixels, the computer vision engine may identify the "blob" of pixels as a depicting part of a common foreground object and attempt to track its position from frame to frame. For example, the position and kinematics of the foreground object determined from one frame (or frames) may be used to predict a future position of the foreground object in a subsequent frame. Further, a classifier may be configured to evaluate a variety of features derived from observing a foreground blob and classify it as being a particular thing, e.g., as actually depicting a person or a vehicle. Once so classified, a machine learning engine may observe the behavior of the vehicle and compare it with the observed behavior of other objects classified as being a vehicle.

As suggested, the background model may be generated using an average of pixel values. For example, the value for a given pixel in the background model may be a weighted average of that pixel determined over X number of frames. Once an initial background image is generated, it may be updated using values for pixels in a current image, when such pixels are not classified as depicting a foreground object. Doing so helps account for camera noise (i.e., for changes in pixel value from frame-to-frame introduced by the camera and not changes in the scene) and also allows for the background image to be updated to reflect gradual changes in lighting over time. For example, returning to the example of a camera trained on a highway, gradual lighting changes caused by movement of the sun or by changes in cloud cover may be reflected in the background image. Thus, from frame-to-frame, small differences in pixel values between a pixel in a current frame and the corresponding pixel in the background image may not result in the computer vision engine concluding that the pixel depicts a foreground object and such changes may help maintain of the accuracy of the background image.

Unlike gradual changes in lighting mentioned above, sudden lighting changes present different challenges. A sudden lighting change occurs when the illumination of the scene changes dramatically from one frame to the next (or over a small number of frames). A sudden lighting change occurring in some region of the scene may lead the computer vision engine to conclude that a new foreground object has appeared, when, in fact, one has not. A variety of events may result in a sudden lighting change. For example, the headlights of a car traveling on the roadway may illuminate portions of the road surface or other portions of scene background, resulting in dramatic changes in pixel values. A break in the clouds may result in a sudden illumination change where a large portion of the scene not illuminated with direct sunlight in one frame is brightly illuminated in the next (or vice-versa). Or more simply, a light source in the scene (e.g., a light along a roadside) switches on (or off). In such cases, portions of the scene classified as depicting a foreground object may actually depict a region of scene background, lighted differently.

Sudden illumination changes may contaminate the analysis of a scene by falsely identifying new foreground objects. That is, when a sudden illumination change occurs, pixel values in a current frame may sufficiently differ from corresponding pixel values in the background model such that groups of pixels are misclassified as depicting a foreground object, when in reality such pixels depict scene background, albeit lighted differently. Accordingly, when a sudden illumination change is detected, pixels misclassified as a result of the sudden illumination change may be re-classified as depicting scene background. For example, co-pending U.S. patent application Ser. No. 12/336,382, entitled "Hierarchical Sudden Illumination Change Detection Using Radiance Consistency within A Spatial Neighborhood" describes one approach for detecting when a sudden illumination change has occurred. Specifically, the '382 application discloses that sudden illumination changes may be detected using radiance consistency within a spatial neighborhood. That is, to determine whether a given pixel value in an image of video has undergone a sudden illumination change, the radiance values of pixels neighboring the given pixel may be evaluated.

Embodiments of the present invention may be used as part of a computer vision engine to update both a background model and the thresholds used to classify pixels in a background image as depicting scene foreground or background in response to detecting that a sudden illumination changes has occurred in a sequence of video frames. The background model may include the background image as well data related to the background image (e.g., the thresholds used to classify a pixel in a current video frame as depicting scene background or foreground).

As disclosed herein, a background/foreground (BG/FG) component of a behavior recognition system may be configured to generate a background image depicting a scene background. In one embodiment, a classification threshold may specify how much the radiance (or color channel values) of a given pixel in a current frame of video may differ from a corresponding radiance (or color channel values) of that pixel in the background image before that pixel is classified as depicting foreground. Further, the BG/FG component may periodically evaluate a current video frame to determine whether a sudden illumination change has occurred in lighting conditions of the scene. Further still, when a sudden illumination change is detected, the values for pixels affected by sudden illumination change may be used to update the value in the background image to reflect the value for that pixel following the sudden illumination change. Additionally, as the values in the background image may be an average value updated from frame-to-frame, the classification threshold for a given pixel may be updated from frame-to-frame as well. That is, the threshold for classifying a pixel as depicting foreground/background in may be updated from frame-to-frame (whether the pixel is determined to have been affected by a sudden illumination change or not).

Additionally, data from output from the computer vision engine may be supplied to the machine learning engine. As events occur, and re-occur, the machine learning engine may create, encode, store, retrieve, and reinforce patterns representing the events observed to have occurred. Further still, patterns representing an event of interest may result in alert to users of the behavioral recognition system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and a set of numerical data generated by the computer vision engine 135. The machine learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
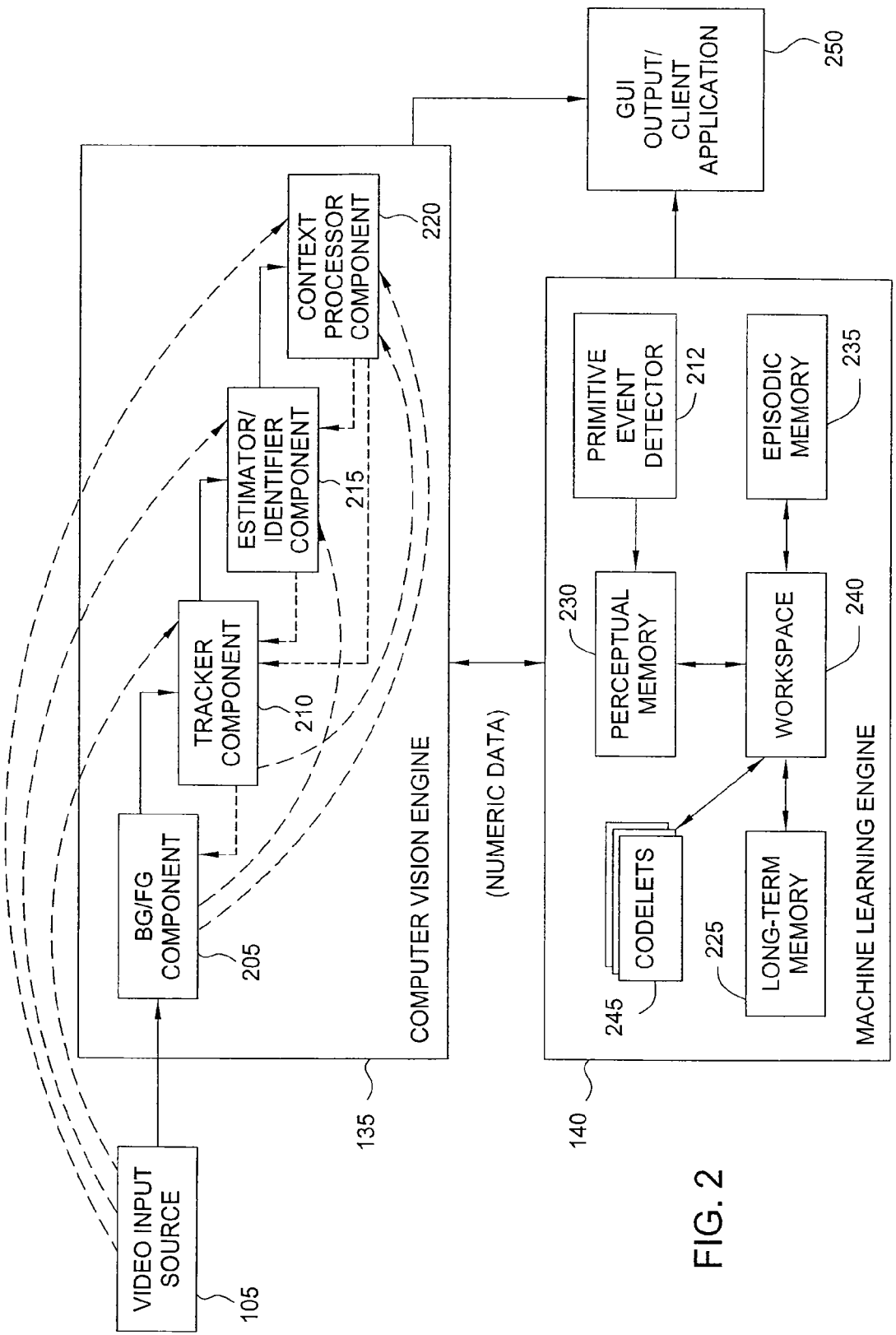
FIG. 2 further illustrates components of the behavior recognition system shown in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline. Additionally, portions of the scene determined to depict scene background maybe used to update pixel values in a background image modeling the scene. Further, as described in greater detail below, the BG/FG component 205 may periodically determine whether a sudden illumination change (SIC) has occurred and update the background image accordingly.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object.

The context processor component 220 may receive the output from other stages of the pipeline (i.e., the tracked objects, the background and foreground models, and the results of the estimator/identifier component 215). Using this information, the context processor 220 may be configured to generate an annotated map of the scene segmented into spatially separated regions. The regions may be labeled as natural or man-made and sorted according to occluding region pairs (i.e., regions may be determined to be in front of (or behind) other regions).

The computer vision engine 135 may take the outputs of the components 205, 210, 215, and 220 describing the motions and actions of the tracked objects in the scene and supply this to the machine learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine learning engine 140 includes a long-term memory 225, a perceptual memory 230, an episodic memory 235, a workspace 240 and codelets 245. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135. The episodic memory 235 stores data representing observed events with details related to a particular episode, e.g., information describing time and space details related on an event. That is, the episodic memory 235 may include details describing "what and where" something occurred within a scene such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an adaptive resonance theory (ART) network and a sparse-distributed memory data structure.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a small software program configured to find interesting patterns. In turn, the codelet may create, retrieve, reinforce, or modify memories in the episodic memory 235 and the long-term memory 225 (i.e., when a pattern is identified). By repeatedly scheduling codelets for execution, copying memories and percepts to/from the workspace 240, the machine learning engine 140 performs a cognitive cycle used to observe, and learn, about patterns of behavior that occur within the scene.

Figure 3:
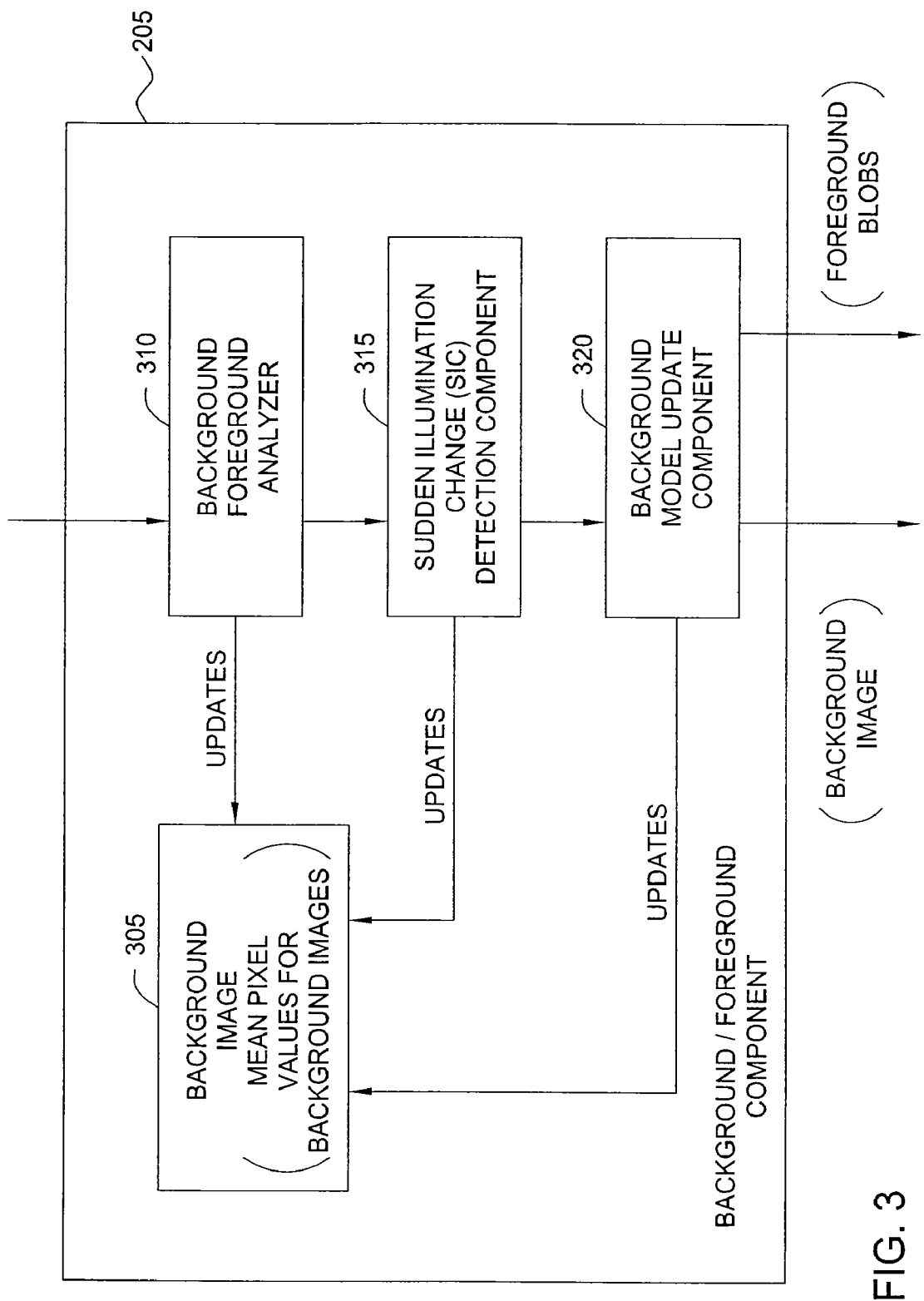
FIG. 3 illustrates an example of a background/foreground component of a computer vision engine, according to one embodiment of the invention.

FIG. 3 illustrates an example of the background/foreground (BG/FG) component 205 of the computer vision engine 135, according to one embodiment of the invention. As stated, the BG/FG component 205 may be configured to detect sudden illumination changes occurring in a sequence of video frames, and update elements of a background model 305. In this example, the BG/FG component 205 includes a background/foreground analyzer 310, a sudden illumination change (SIC) detection component 315, a background model update component 320, and a background image 305. Illustratively, the BG/FG component 205 receives input from the video source (e.g., a video camera) in the form of a raw video frame, and outputs a background image 305—representing the current model of the background of the scene—and also outputs a set of foreground blobs (or patches), each including a set of pixels believed to correspond to a foreground object depicted in the scene.

In one embodiment, the background/foreground analyzer 310 may provide a software module configured to generate background image 305 from a sequence of raw video frames. For example, the background/foreground analyzer 310 may initially use a set of sequential video frames as training data. In such a case, the background/foreground analyzer 310 may determine a value for a given pixel in the background image 305 by evaluating a value for that pixel in multiple images of raw video, e.g., an initial value for the pixel may be an average determined from the multiple images. More sophisticated approaches may include determining a statistical distribution of values for the pixel and determining an average value using only ones that fall within a particular range (e.g., within one standard deviation on either side of the mean).

Once the background/foreground analyzer 310 generates an initial background image 305, subsequent frames of video may be used to update the pixel values in the background image 305. Further, the background/foreground analyzer 310 may be configured to evaluate each raw video frame using the background image 305 and classify pixels as depicting either scene foreground or scene background. Typically, the pixel values in a raw video frame may be compared with the value for the corresponding pixels in the background image 305. If the values of the two pixels differ by a sufficient amount, then a given pixel may be classified as depicting part of a foreground object. In one embodiment, the amount may be determined using a classification threshold, itself determined relative to a model of camera noise measured relative to pixel intensity. Contiguous regions of pixels that differ from the pixel values in the background image may be classified as depicting a common foreground object (evaluated by other portions of the computer vision engine). On the other hand, if a given pixel in the raw frame of video is classified as depicting scene background, then the value of the pixel in the raw video frame may be used to update the corresponding value in the background image 305.

As stated, the background model may include a mean value for each pixel in the background image 305 and a classification threshold specifying how much a pixel in a current frame may differ from the mean value in the background image 305 and remain classified as depicting scene background. In one embodiment, the BG/FG analyzer 310 may determine a relative deviation between a current pixel and a corresponding pixel from the background image using the following equations:

$$\rho_R = \frac{255}{|R - \overline{R}| + 1}$$

$$\rho_G = \frac{255}{|G - \overline{G}| + 1}$$

$$\rho_B = \frac{255}{|B - \overline{B}| + 1}$$

From these equations, the relative deviations $\rho_R$, $\rho_G$, and $\rho_B$ are calculated for each of the R, G, B color channels for a pixel, where R, G, and B each represent a respective color channel value for a pixel from a current frame and where $\overline{R}$, $\overline{G}$, and $\overline{B}$ each represent a corresponding mean pixel value from the background image 305. For a grayscale image, only one of $\rho_R$, $\rho_G$, and $\rho_B$ need be calculated.

An overall relative difference ($\Delta$) for each pixel may be calculated from the values for the three R, G, and B, channels as follows:

$$\Delta = \frac{1}{2}\{\rho_R + \rho_G + \rho_B - \min(\rho_R, \rho_G, \rho_B)\}$$

Figure 5A:
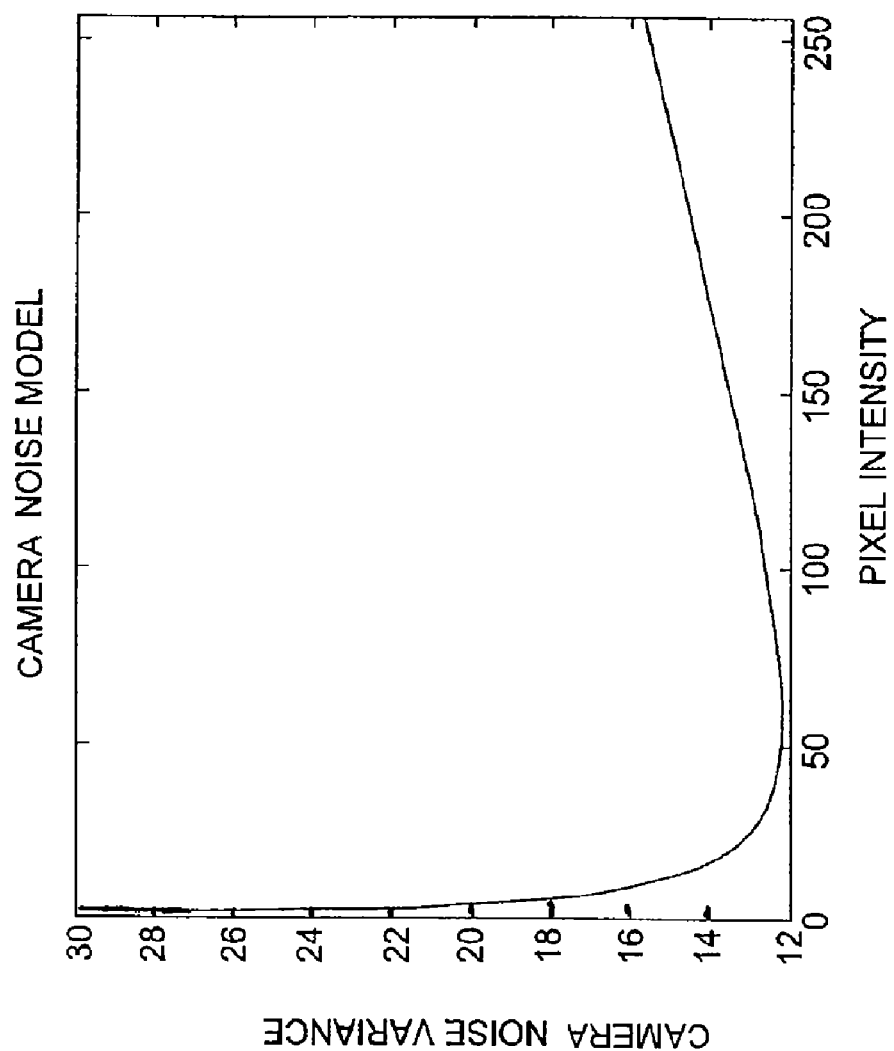
FIGS. 5A-5B are graphs representing an example assigned based on pixel intensity values and noise levels for a video camera, according to one embodiment of the invention.
Figure 5B:
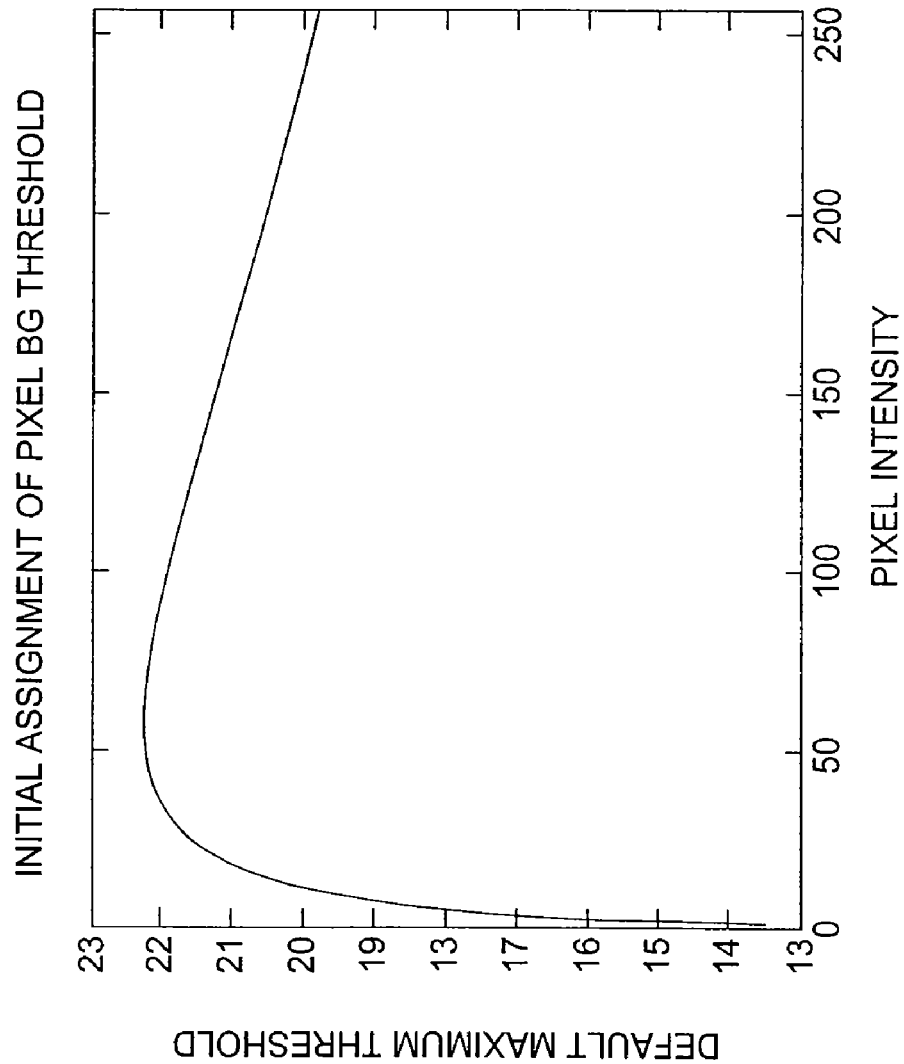

Using this equation, the noisiest channel is removed from the calculation, and the remaining two channels are averaged to arrive at the overall relative difference ($\Delta$). In one embodiment, the overall relative difference ($\Delta$) is compared to a classification threshold specified for a given pixel and that pixel is classified as background if the relative difference ($\Delta$) exceeds (or is equal to) the threshold and classified as foreground otherwise. As stated, the actual classification threshold for a given pixel may be assigned by BG/FG component 205 based on a pixel intensity for the pixel in the background image and an expected amount of camera noise at that intensity. For example, FIG. 5A illustrates a typical camera noise model 500. And FIG. 5B illustrates an example graph 550 of maximum BG/FG thresholds to assign to pixels based on pixel intensity values and the example camera noise levels shown in FIG. 5A. In one embodiment, the maximum threshold for a pixel having intensity e is given by:

$$\xi_e^{max} = \frac{255}{3\sigma_e + 1}$$

where $\xi_e^{max}$ is the maximum threshold at intensity e and $\sigma_e$ is a standard deviation for camera noise at pixel intensity e. The graph 550 illustrated in FIG. 5B is determined using the equation for $\xi_e^{max}$ given above and the noise model 500 of FIG. 5A. In this example, a pixel intensity of 50 would be assigned an initial BG/FG threshold of roughly 22 and a pixel intensity of 200 would be assigned an initial BG/FG threshold of 20.

Additionally, as described in greater detail below, a sudden illumination change occurs when the lighting intensity of the scene changes dramatically—which may result in pixels being incorrectly classified as depicting scene foreground. In one embodiment, this result may be addressed by detecting that a sudden illumination change has occurred and updating the BG/FG threshold value for the pixels affected by the sudden illumination change.

As shown, BG/FG component 205 also includes the SIC detection component 315. In one embodiment, the SIC detection component 315 may provide a software module configured to evaluate the current raw video frame (and foreground blobs) to determine whether a sudden illumination change has occurred. As stated, a sudden lighting change may occur when the illumination of the scene changes dramatically from one frame to the next (or over a small number of frames)—leading to portions of scene background to potentially be misclassified as depicting a foreground object due to changes in scene illumination.

In one embodiment, sudden illumination changes may be detected using radiance consistency within a spatial neighborhood. That is, to determine whether a given pixel value in an image of video has undergone a sudden illumination change, the radiance values of pixels neighboring the given pixel are evaluated. The (BG/FG) component may evaluate the background image and foreground blobs derived from a current video frame to determine whether a sudden illumination change has occurred. If a majority of pixels of a foreground blob indicate that a sudden illumination change has occurred, such pixels may be classified as depicting background of the scene (and not scene foreground). Further, such pixels may be used to update the background image so that the pixel values in the background model reflect the sudden illumination change. For example, in one embodiment, the spatial neighbored for a given pixel may include a 3×3 grid of pixels with the given pixel in the center of the 3×3 grid.

Additionally, the SIC detection component 315 may operate every N seconds, where N is set as a matter of user preference. Additionally, the SIC detection component 315 may evaluate a given pixel relative to the radiance or intensity (e.g., grey scale values) of neighbors of that pixel in the raw image and the radiance of neighbors of the corresponding pixel in the background image. If a majority of a foreground blob are affected by a sudden illumination change, the SIC detection component 315 may update the foreground blobs and the background image 305. For example, pixels classified as depicting a foreground blob may be reassigned as depicting background, effectively deleting the blob from being evaluated as a foreground object by other components of the computer vision engine 135 or the machine learning engine 140.

Further, the BG update component 320 may be configured to update the BG/FG thresholds for pixels affected by a sudden illumination change. Referring again to the graph 500 of FIG. 5, for example, assume that a pixel with an initial BG/FG threshold of 22 (based on an intensity of roughly 50) undergoes a sudden illumination change where the pixel intensity jumps to 200 (i.e., the pixel become substantially brighter). In such a case, the BG update component 320 may be configured to decrease the BG/FG threshold to a value slightly less than the overall relative difference ($\Delta$) determined for the pixel determined to have been affected by the sudden illumination change. In one embodiment, the BG/FG threshold of a pixel determined to have undergone a sudden illumination change is reduced using the following equation:

$$\xi_{current} = (\Delta - \epsilon)$$

Where $\xi$ is the classification threshold, $\Delta$ is the overall relative deviation and $\epsilon$ is a small value such as $1.0 \times 10^{-6}$. Doing so helps prevent the pixel from being classified as foreground in subsequent frames while changes to the $\overline{R}$, $\overline{U}$, and $\overline{B}$ stabilize in the background image 305. Once reduced, as described in greater detail below, the threshold may be slowly incremented towards a threshold of slightly greater than 20 (corresponding to the new intensity of 200) over a number of following frames as the classification threshold for each pixel is updated from frame-to-frame.

The BG image update component 320 may also update the $\overline{R}$, $\overline{G}$, and $\overline{B}$ values in the background image 305 from frame-to-frame. For example, pixels not classified as having undergone a sudden illumination change may be updated using a running (or rolling) average for the $\overline{R}$, $\overline{U}$, and $\overline{B}$ values for that pixel. For pixels having undergone a sudden illumination change, the $\overline{R}$, $\overline{U}$, and $\overline{B}$ values may be updated in such a way so as to bias these values towards a new stable average. For example, in one embodiment, the following equations may be used to update color channel values in the background image 305:

$$bg_r = \alpha(bg_r) + (1-\alpha)(raw_r) \quad bg_g = \alpha(bg_g) + (1-\alpha)(raw_g)$$
$$bg_b = \alpha(bg_b) + (1-\alpha)(raw_b)$$

In these equations $bg_r$, $bg_g$, and $bg_b$ represent the value for the R, G, and B channels in the background image 305 and $raw_r$, $raw_g$, and $raw_b$ represent the R, G, and B color channels values for this pixel from the current frame. Additionally, a represents a tunable parameter for how heavily weighted the new value is used to bias the calculation of the $\overline{R}$, $\overline{G}$, and $\overline{B}$ mean values in the background image 305 for each respective color channel. In one embodiment, valid values for a may fall within a range of [0,1], inclusive. For example, a value of 0.5 may be used to give equal weight to the old mean values (R, G, and B) and the new values ($raw_r$, $raw_g$, and $raw_b$), i.e., for biasing the values in the background image 305 towards a new stable average following the sudden illumination change.

FIG. 4 illustrates a method 400 for updating the classification thresholds assigned to pixels determined to have undergone a sudden illumination change, according to one embodiment of the invention. As shown, the method 400 begins at step 405 where the BG/FG component 205 determines what thresholds should be used to classify pixels as depicting scene foreground or background, e.g., based on a camera nose model. At step 410, the BG/FG component 205 trains a background model for a given scene observed by a video camera. For example, in one embodiment, the BG/FG component 205 may analyze a sequence of frames and compute an average value for each pixel from the values of that pixel over the sequence of frames. Of course, other approaches may be used to generate an initial background model of the scene.

Once the background model is available, the BG/FG component 205 assigns a classification threshold value for each pixel based on an intensity/brightness/radiance/grayscale value of that pixel and the camera nose model. For example, a camera noise model like the one shown in FIG. 5A may be used to generate a maximum threshold value to assign to each respective pixel, relative based on pixel radiance. As described above, the threshold for a pixel (at a given radiance or intensity) specifies how much the pixel may deviate from the background model before being classified as foreground. For example, the equations given above for $\rho_R$, $\rho_G$, and $\rho_B$ may be used to determine an overall relative difference ($\Delta$) and compared to the threshold value assigned to a given pixel.

At step 415, for each frame of video captured by the video camera, the BG/FG component 205 may evaluate each pixel using the equations described above and classify each pixel as depicting scene foreground or scene background, based on the thresholds assigned to each respective pixel in the background model and the value for each respective pixel in the current raw frame of video. In one embodiment, pixels having a overall relative difference ($\Delta$) above their threshold are classified as background and pixels where the overall relative difference ($\Delta$) is below the threshold are classified as foreground.

At step 420, some pixels values in the background image may be updated, based on the value for pixels in the current raw frame classified as depicting scene background. For example, in one embodiment, the background image includes an average pixel value determined for each pixel over multiple frames. In such a case, values for pixels classified as depicting scene background in the current raw frame are used to update the values for that pixel in the background image. That is, the value for a pixel in the current frame is used to update the $\overline{R}$, $\overline{G}$, and $\overline{B}$ values for that pixel in the background image. Including the value of pixels depicting scene background allows the gradual lighting changes to bleed into the background image of the background model from frame-to-frame. Additionally, at step 420, once a pixel value is updated in the background image, the threshold for classifying that pixel as foreground/background may also be updated. In one embodiment, the threshold is updated according to the following:

$$\xi_{new} = \xi_{current} + \beta(\xi_{max})$$

Where $\xi_{new}$ is the new classification threshold to assign to the pixel, $\xi_{current}$ is the current threshold for the pixel, and $\xi_{max}$ is the maximum allowable threshold based current $\overline{R}, \overline{U}$, and $\overline{B}$ values for the pixel, as determined, e.g., from graph 550. Thus, the thresholds assigned to each pixel may generally follow the "drift" of that pixel from frame-to-frame.

Further, in one embodiment, the $\overline{R}, \overline{G},$ and $\overline{B}$ values include only a specified number of recent frames to determine the mean values. In such a case, the current value from the raw frame may replace the oldest value, and the average is then recomputed. Further still, as the mean value (for a given pixel) in the background image drifts due to camera noise (or gradual changes in scene lighting) the thresholds for classifying scene pixels as foreground/background may also be adjusted accordingly. That is, as the value in the background image drifts (e.g., either due to camera noise or gradual lighting changes), the threshold may also be updated. For example, assume that a video camera is trained on an outdoor parking lot. In such a case, in the morning, as the scene gradually brightened, the thresholds assigned to pixels would gradually decrease as the intensity of the pixels in the raw frame increased (at least for a video camera with a noise model consistent with the one shown in FIG. 5).

At step 430, the SIC detection component 315 may determine whether a sudden illumination change has occurred in the scene. That is, the SIC detection component 315 may evaluate each pixel included in a given foreground blob to determine whether the pixels in that blob have been misclassified as depicting foreground as a result of a sudden change in lighting conditions in the scene. For example, as mentioned above, the '382 application discloses that sudden illumination changes may be detected using radiance consistency within a spatial neighborhood. That is, to determine whether a given pixel value in an image of video has undergone a sudden illumination change (referred to as a candidate SIC pixel), the radiance values of pixels neighboring the given pixel may be evaluated. In one embodiment, the SIC detection process may be performed periodically, e.g., every N seconds, where N may be tailored to suit the needs in a particular case.

Additionally, when a sudden illumination change is detected, the SIC detection component 315 may reclassify such pixels as depicting scene background. However, the action taken may depend on both the size of the particular foreground blob and how many pixels in the blob are determined to be candidate SIC pixels. For example, in one embodiment, if the foreground blob is small (e.g., roughly 100 pixels or less) and more than half of the pixels indicate as being candidate SIC pixels, the entire blob may be discarded from the foreground image, and the pixels in the blob may be reclassified as background. For a large FG blob (e.g., one greater than 100 pixels), if more than half of the pixels indicate as being candidate SIC pixels, only the candidate SIC pixels are reclassified as background—leaving other pixels in the blob classified as depicting scene foreground. Further, in either case, the thresholds for pixels reclassified as background may be adjusted based on the radiance of such pixels following the sudden illumination change. These rules are summarized in the following table:

TABLE 1

Rules to discarded potential SIC pixels from FG image

| Size of FG blob | % classified as SIC | Action |
| --- | --- | --- |
| Small (e.g., <100 pixels) | >50% | Discard whole FG blob |
| Large (e.g., >100 pixels) | >50% | Discard SIC pixels from FG blob |

Of course, other rules may be used and tailored to suit the needs in a particular case.

Referring again to step 430, if no sudden illustration change is detected for the foreground blobs in a given frame, then the method 400 returns to step 415 where the BG/FG component 205 evaluates the next frame and classifies pixels as depicting scene foreground or background. This repeats until the SIC component again evaluates the scene to determine whether a sudden illumination change has subsequently occurred. Otherwise, if a sudden illumination change is detected, then at step 435, the BG update component 320 may be configured to reduce the threshold value for a pixel reclassified as background as a result of the sudden illumination change to a temporary threshold below that of the current overall relative difference ($\Delta$). Doing so should ensure that the pixel will be classified as background in the following frame(s). As noted above, the overall relative difference ($\Delta$) may be calculated as $$\Delta = \frac{1}{2}\{\rho_R + \rho_G + \rho_B - \min(\rho_R, \rho_G, \rho_B)\}$$

using the $\rho_R$, $\rho_G$, and $\rho_B$ equations given above.

For example, assume a pixel depicting scene background has a radiance intensity of 50 and that it undergoes a sudden illumination change, resulting in a radiance of 200. In such a case, the overall relative difference ($\Delta$) is likely to be substantially below the then current threshold. Using the red and green channels as an example, the value for the overall relative difference ($\Delta$) is given by the average of $$\rho_R = \frac{255}{|R-\overline{R}|+1} \text{ and } \rho_G = \frac{255}{|G-\overline{G}|+1}.$$

Using these equation, when the current values for R and G (the current pixel value for the red and green channels) change substantially from the value for $\overline{B}$ and $\overline{U}$ (the value for the red channel in the background model), the absolute magnitude given by $|R-\overline{R}|$ and $|G-\overline{G}|$ increases. At the same, this results in the ratios of $$\frac{255}{|R-\overline{R}|+1} \text{ and } \frac{255}{|G-\overline{G}|+1}$$

decreasing. That is, the more dramatic the sudden illumination change (as reflected in changing color channel values), the smaller the overall relative difference ($\Delta$) becomes.

When the overall relative difference ($\Delta$) falls below the threshold due to a sudden illumination change, the BG update component 320 may reduce the threshold assigned to this pixel to a value below slightly the overall relative difference ($\Delta$) becomes—well below the threshold that would be assigned to a pixel having a radiance of 200. Doing so allows the pixel values in the background image to stabilize following the sudden illumination change without the pixel also being misclassified as depicting scene foreground in subsequent frames. In a particular embodiment, the threshold assigned to an SIC pixel is given by the equation $\xi_{new}=(\Delta-\epsilon)$ where $\xi_{new}$ is the new threshold, $\Delta$ is the overall relative difference ($\Delta$) occurring when sudden illumination change is detected, and $\epsilon$ is small value such as $1.0 \times 10^{-6}$.

Additionally, in frames following the sudden illumination change, the values for the pixel in the raw frame may be used to update the corresponding pixel values in the background image. For example, the values for a pixel following a sudden illumination change may used to bias the mean value in the background model (step 440). In one embodiment, the values for $bg_r$, $bg_g$, and $bg_b$ may be updated using the equations first listed above of:

$$bg_r = \alpha(bg_r) + (1-\alpha)(\text{raw}_r) \quad bg_g = \alpha(bg_g) + (1-\alpha)(\text{raw}_g)$$
$$bg_b = \alpha(bg_b) + (1-\alpha)(\text{raw}_b)$$

Pixels not affected by a sudden illumination change may be updated as well, e.g., by adding the current RGB values to a running (or rolling) average for that pixel.

The thresholds used to classify a pixel as depicting scene background or foreground may also be updated from frame-to-frame. That is, as the $\overline{R}$, $\overline{G}$, and $\overline{B}$ values change from frame-to-frame, the classification thresholds may be changed as well. For example, FIG. 5B illustrates a graph 550 which specifies a maximum threshold value ($\xi_{max}$) to assign a pixel, relative to the intensity of that pixel and the camera nose model 500 of FIG. 5A. In one embodiment, if the $\overline{R}$, $\overline{G}$, and $\overline{B}$ pixel values change in a way that the assigned classification threshold exceeds the maximum value for that pixel, then the classification threshold is clipped to the maximum $\xi_{max}$. Otherwise, the classification threshold may be updated by a amount set as a matter of preference. In one embodiment, the threshold is updated according to the following:

$$\xi_{new} = \xi_{current} + \beta(\xi_{max})$$

Where $\xi_{new}$ is the new classification threshold to assign to the pixel, $\xi_{current}$ is the current threshold for the pixel, and $\xi_{max}$ is the maximum allowable threshold based on the current $\overline{R}$, $\overline{G}$, and $\overline{B}$ values for the pixel, as determined, e.g., from graph 550. Additionally, $\beta$ represents a tunable parameter. In one embodiment, $\beta$ is 0.001. Referring again to the method 400, at step 445, Pixels determined to have undergone a sudden illumination change are incremented using the same equation. For example, in one embodiment, after the classification thresholds $\xi$ are reduced to a value below the overall relative difference ($\Delta$) according to $\xi_{new} = (\Delta - \epsilon)$, the thresholds are incremented in subsequent frames using the equation $\xi_{new} = \xi_{current} + \beta(\xi_{max})$.

Figure 6:
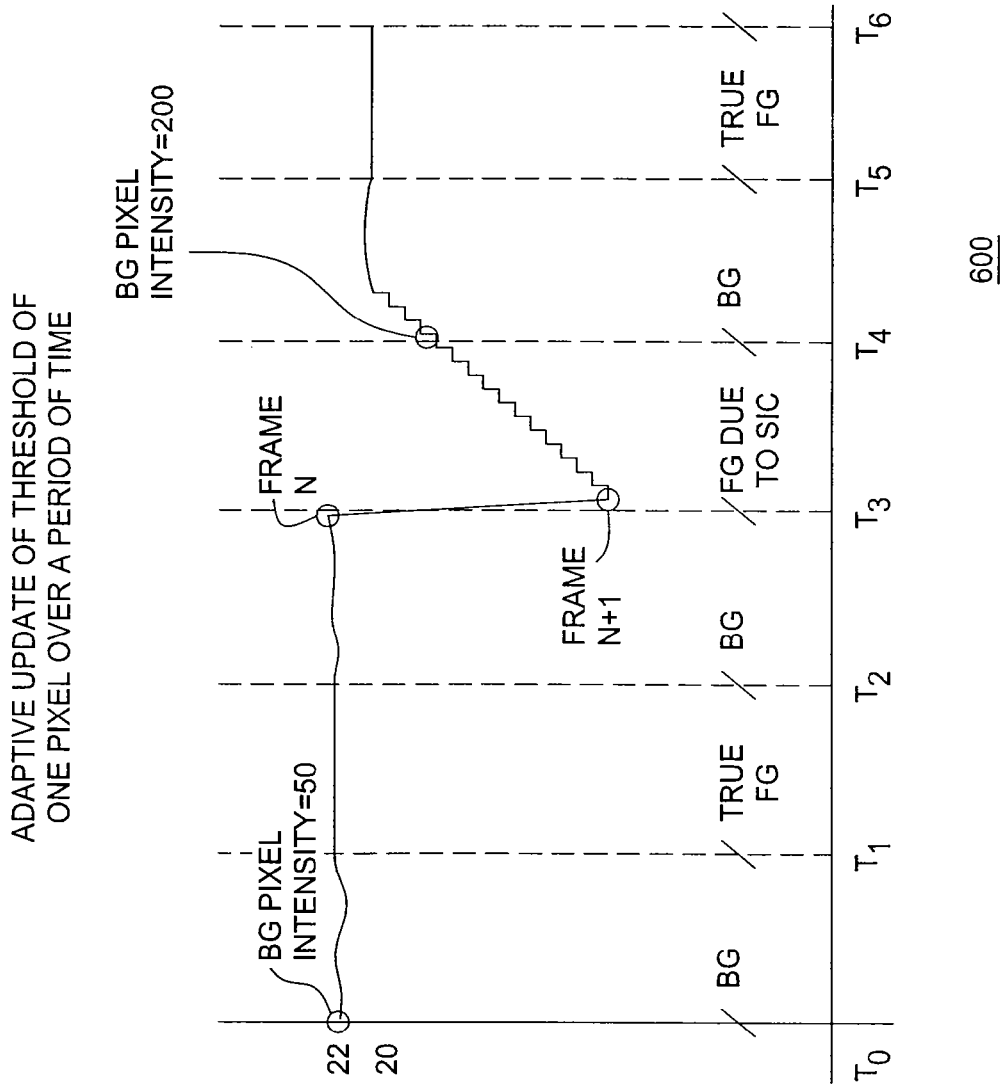
FIG. 6 is a graph illustrating an adaptive update of BG/FG thresholds using sudden illumination change detection, according to one embodiment of the invention.

FIG. 6 is a graph 600 illustrating and adaptive update of BG/FG thresholds using sudden illumination change detection, according to one embodiment of the invention. As shown, the horizontal axis represents a time period over which the computer vision engine 135 and BG/FG component 205 may evaluate a sequence of video frames, as well as update background pixel thresholds in response to detecting a sudden illumination change. And the vertical axis shows the threshold for classifying a given pixel as depicting scene foreground or background. Note in this example, it is assumed that a background model is available which provides a set of values (e.g., RGB, grayscale, and/or radiance values ) representing the pixel values expected to be obtained when the scene background is visible to the camera.

Illustratively, at time To, the intensity of the given pixel is 50, resulting in an initial threshold of 22. Further, between time $T_0$ and $T_1$ the threshold for this pixel varies slightly from frame to frame. This may occur as camera noise causes the mean value in the background model to vary, leading to some minor drift in the threshold used for each successive frame. However, at time $T_1$, and between time $T_1$ and $T_2$, this pixel becomes occluded by a foreground object. During this period, as the value in the background model is not updated, the threshold remains fixed. At time $T_2$, the background becomes visible again (i.e., the color values for the pixel return to an expected value based on the background model). And during the period between time $T_2$ and $T_3$ some variation in the threshold occurs as the mean value for this pixel in the background model is updated from frame-to-frame.

At time $T_3$ (also labeled Frame N) a sudden illumination change is detected. As described, the sudden illumination change may be detected evaluating the radiance consistency of pixels within a given spatial neighborhood. In response, at Frame N+1, the BG update component 320 reduces the background threshold to a value well below the threshold of 20 appropriate for the intensity of the pixel following the sudden illumination change (approximately 200 in this example). Thereafter, (at frame N+2, N+3, etc.) the value of the threshold is incremented slightly with each successive frame, e.g., using the equation $\xi_{new} = \xi_{current} + \beta(\xi_{max})$ discussed above. At the same time, the mean value in the background model is biased towards the values following the sudden illumination change. For example, as described above, the $bg_r$, $bg_g$, and $bg_b$ values may be calculated as a weighted average of the background model value and the current value of the pixel in a raw frame. As shown in FIG. 6, between times $T_3$ and $T_4$, the threshold increments towards the new thresholds of roughly 20. Between times $T_4$ and $T_5$ the incrementing reaches the background value of roughly 20 determined relative to the value in the background model) and the incrementing stops. Between times $T_5$ and $T_6$ the pixel is occluded by a foreground object and the threshold remains fixed while this pixel depicts an element of the foreground object.

At time $T_4$, the background value reaches a stable radiance value of 200 and is not updated using the averaging equations given above. In one embodiment, the background update component may recognize that a stable value has been reached when the difference between a radiance value in the current background image and corresponding pixel radiance value from a raw image are within a specified magnitude of one another. However, the threshold value continues to be updated (after being reduced to a value below the overall relative difference ($\Delta$) calculated when the SIC was detected) until the threshold reaches the correct value for that pixel based on the value in the background image and the camera noise model (e.g. a threshold of 20 based on a radiance of 200)

Advantageously, embodiments of the present invention may be used as part of a computer vision engine to update both a background model and the thresholds used to classify pixels as depicting scene foreground or background, in response to detecting that a sudden illumination changes has occurred in a sequence of video frames. In one embodiment, a threshold value may be used to specify how much a given pixel radiance (or color channel values) may differ from the background before that pixel is classified as depicting foreground in a given frame. Further, the BG/FG component may periodically evaluate a current video frame to determine whether a sudden illumination change has occurred in lighting conditions of the scene Further still, when a sudden illumination change is detected, the values for pixels affected by sudden illumination change may be used to update the value in the background image to reflect the value for that pixel following the sudden illumination change as well as update the threshold for classifying that pixel as depicting foreground/background in subsequent frames of video.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a sequence of video frames depicting a scene captured by a video camera, the method comprising:

classifying each of a plurality of pixels in a first frame of the sequence of video frames as depicting one of scene background and scene foreground, wherein each pixel is classified based on a comparison of (i) a relative deviation determined using a pixel value from the first frame and a corresponding pixel value in a background image and (ii) a classification threshold assigned to each pixel in the background image; and upon determining that a group of pixels in the first frame were classified as depicting scene foreground as a result of a sudden illumination change (SIC):

for each pixel in the group of pixels:
re-classifying the pixel as depicting scene background, and
decreasing the classification threshold assigned to the pixel to a value below the relative deviation determined for the pixel; and for one or more successive frames of video following the first frame:
updating the pixel values in the background image corresponding to the group of pixels, based on pixel values obtained from video frames following the first frame, and
increasing the classification threshold assigned to pixels in the background image for pixels corresponding to the group of pixels.

2. The computer-implemented method of claim 1, wherein the pixel values in the background image represent a pixel value expected to be present in a frame of video captured by the video camera when the pixel depicts scene background.

3. The computer-implemented method of claim 1, further comprising:

prior to classifying each of the plurality of pixels in the first frame of the sequence of video frames as depicting one of scene background and scene foreground, assigning an initial threshold to the pixel values in the background image based on a camera noise model and an initial radiance of a respective pixel in the background image.

4. The computer-implemented method of claim 1, wherein classifying each of the plurality of pixels in the first frame of the sequence of video frames as depicting one of scene background and scene foreground, comprises:

determining the relative deviation as $\rho_R$, $\rho_G$, and $\rho_B$ between a first pixel in the first frame and the corresponding pixel in the background image according to:

$$\rho_R = \frac{255}{|R - \overline{R}| + 1}$$

$$\rho_G = \frac{255}{|G - \overline{G}| + 1}$$

$$\rho_B = \frac{255}{|B - \overline{B}| + 1}$$

wherein R, G, and B represent a color channel value for the first pixel in the first frame and wherein $\overline{R}$, $\overline{G}$, and $\overline{B}$ each represent a corresponding pixel color channel value from the background image;

determining an overall relative difference (Δ) from the $\rho_R$, $\rho_G$, and $\rho_B$ values;

classifying the first pixel as depicting scene background when the overall relative difference (Δ) is above or equal to the threshold assigned to the first pixel; and classifying the first pixel as depicting scene foreground when the overall relative difference (Δ) is below the threshold assigned to the first pixel.

5. The computer-implemented method of claim 4, wherein the overall relative difference (Δ) for the first pixel is calculated from the $\rho_R$, $\rho_G$, and $\rho_B$ values according to:

$$\Delta = \frac{1}{2}\{\rho_R + \rho_G + \rho_B - \text{minimum}(\rho_R, \rho_G, \rho_B)\}.$$

6. The computer-implemented method of claim 1, further comprising:

classifying one or more of the pixels in the group as being an SIC candidate pixel by evaluating a spatial neighborhood of each pixel in the group, wherein the spatial neighborhood comprises a 3×3 grid of pixels with the pixel being evaluated at the center of the 3×3 grid.

7. The computer-implemented method of claim 6, wherein determining that the group of pixels in the first frame were classified as depicting scene foreground as the result of the sudden illumination change (SIC) comprises, determining that a majority of pixels in the group are classified as SIC candidate pixels, based on the evaluations of the spatial neighborhoods of the pixels in the group.

8. The computer-implemented method of claim 1, wherein the pixel values in the background image corresponding to the group of pixels are updated according to the following:

$$bg_r = \alpha(bg_r) + (1-\alpha)(\text{raw}_r) \quad bg_g = \alpha(bg_g) + (1-\alpha)(\text{raw}_g)$$
$$bg_b = \alpha(bg_b) + (1-\alpha)(\text{raw}_b)$$

wherein $bg_r$, $bg_g$, and $bg_b$ represent color channel values for a respective pixel in the background image, $\text{raw}_r$, $\text{raw}_g$, and $\text{raw}_b$ represent the R, G, and B color channels values for the corresponding color channel values in a current frame, and wherein α represents a value selected from a range of [0,1], inclusive.

9. A computer-readable storage medium containing a program which, when executed by a processor, performs an operation for analyzing a sequence of video frames depicting a scene captured by a video camera, the operation comprising:

classifying each of a plurality of pixels in a first frame of the sequence of video frames as depicting one of scene background and scene foreground, wherein each pixel is classified based on a comparison of (i) a relative deviation determined using a pixel value from the first frame and a corresponding pixel value in a background image and (ii) a classification threshold assigned to each pixel in the background image; and upon determining that a group of pixels in the first frame were classified as depicting scene foreground as a result of a sudden illumination change (SIC):

for each pixel in the group of pixels:
re-classifying the pixel as depicting scene background, and
decreasing the classification threshold assigned to a value below the relative deviation determined for the pixel using the pixel value from the first frame and the corresponding pixel value from the background image; and for one or more successive frames of video following the first frame:
  updating the pixel values in the background image corresponding to the group of pixels, based on pixel values obtained from video frames following the first frame, and
  increasing the classification threshold assigned to pixels in the background image for pixels corresponding to the group of pixels.

10. The computer-readable storage medium of claim 9, wherein the pixel values in the background image represent a pixel value expected to be present in a frame of video captured by the video camera when the pixel depicts scene background.

11. The computer-readable storage medium of claim 9, wherein the operation further comprises:
  prior to classifying each of the plurality of pixels in the first frame of the sequence of video frames as depicting one of scene background and scene foreground, assigning an initial threshold to the pixel values in the background image based on a camera noise model and an initial radiance of a respective pixel in the background image.

12. The computer-readable storage medium of claim 9, wherein classifying each of the plurality of pixels in the first frame of the sequence of video frames as depicting one of scene background and scene foreground, comprises:
  determining the relative deviation as $\rho_R$, $\rho_G$, and $\rho_B$ between a first pixel in the first frame and the corresponding pixel in the background image according to:

$$\rho_R = \frac{255}{|R - \overline{R}| + 1}$$

$$\rho_G = \frac{255}{|G - \overline{G}| + 1}$$

$$\rho_B = \frac{255}{|B - \overline{B}| + 1}$$

wherein R, G, and B represent a color channel value for the first pixel in the first frame and wherein $\overline{R}$, $\overline{G}$, and $\overline{B}$ each represent a corresponding pixel color channel value from the background image;
  determining an overall relative difference ($\Delta$) from the $\rho_R$, $\rho_G$, and $\rho_B$ values;
  classifying the first pixel as depicting scene background when the overall relative difference ($\Delta$) is above or equal to the threshold assigned to the first pixel; and
  classifying the first pixel as depicting scene foreground when the overall relative difference ($\Delta$) is below the threshold assigned to the first pixel.

13. The computer-readable storage medium of claim 12, wherein the overall relative difference ($\Delta$) for the first pixel is calculated from the $\rho_R$, $\rho_G$, and $\rho_B$ values according to:

$$\Delta = \frac{1}{2}\{\rho_R + \rho_G + \rho_B - \text{minimum}(\rho_R, \rho_G, \rho_B)\}.$$

14. The computer-readable storage medium of claim 9, wherein the operation further comprises:
  classifying one or more of the pixels in the group as being an SIC candidate pixel by evaluating a spatial neighborhood of each pixel in the group, wherein the spatial neighborhood comprises a 3×3 grid of pixels with the pixel being evaluated at the center of the 3×3 grid.

15. The computer-readable storage medium of claim 14, wherein determining that the group of pixels in the first frame were classified as depicting scene foreground as the result of the sudden illumination change (SIC) comprises, determining that a majority of pixels in the group are classified as SIC candidate pixels, based on the evaluations of the spatial neighborhoods of the pixels in the group.

16. The computer-readable storage medium of claim 9, wherein the pixel values in the background image corresponding to the group of pixels are updated according to the following:

$$bg_r = \alpha(bg_r) + (1-\alpha)(\text{raw}_r) \quad bg_g = \alpha(bg_g) + (1-\alpha)(\text{raw}_g)$$
$$bg_b = \alpha(bg_b) + (1-\alpha)(\text{raw}_b)$$

wherein $bg_r$, $bg_g$, and $bg_b$ represent color channel values for a respective pixel in the background image, $\text{raw}_r$, $\text{raw}_g$, and $\text{raw}_b$ represent the R, G, and B color channels values for the corresponding color channel values in a current frame, and wherein $\alpha$ represents a value selected from a range of [0,1], inclusive.

17. A system, comprising:
  a video input source configured to provide a sequence of video frames, each depicting a scene;
  a processor; and
  a memory containing a program, which, when executed on the processor is configured to perform an operation for analyzing the scene, as depicted by the sequence of video frames captured by the video input source, the operation comprising:
    classifying each of a plurality of pixels in a first frame of the sequence of video frames as depicting one of scene background and scene foreground, wherein each pixel is classified based on a comparison of (i) a relative deviation determined using a pixel value from the first frame and a corresponding pixel value in a background image and (ii) a classification threshold assigned to each pixel in the background image,
    upon determining that a group of pixels in the first frame were classified as depicting scene foreground as a result of a sudden illumination change (SIC):
      for each pixel in the group of pixels:
        re-classifying the pixel as depicting scene background; and
        decreasing the classification threshold assigned to a value below the relative deviation determined for the pixel using the pixel value from the first frame and the corresponding pixel value from the background image, and
      for one or more successive frames of video following the first frame:
        updating the pixel values in the background image corresponding to the group of pixels, based on pixel values obtained from video frames following the first frame; and
        increasing the classification threshold assigned to pixels in the background image for pixels corresponding to the group of pixels.

18. The system of claim 17, wherein the pixel values in the background image represent a pixel value expected to be present in a frame of video captured by the video camera when the pixel depicts scene background.

19. The system of claim 17, wherein the operation further comprises:
  prior to classifying each of the plurality of pixels in the first frame of the sequence of video frames as depicting one of scene background and scene foreground, assigning an initial threshold to the pixel values in the background image based on a camera noise model and an initial radiance of a respective pixel in the background image.

20. The system of claim 17, wherein classifying each of the plurality of pixels in the first frame of the sequence of video frames as depicting one of scene background and scene foreground, comprises:

determining the relative deviation as $\rho_R$, $\rho_G$, and $\rho_B$ between a first pixel in the first frame and the corresponding pixel in the background image according to:

$$\rho_R = \frac{255}{|R - \overline{R}| + 1}$$

$$\rho_G = \frac{255}{|G - \overline{G}| + 1}$$

$$\rho_B = \frac{255}{|B - \overline{B}| + 1}$$

wherein R, G, and B represent a color channel value for the first pixel in the first frame and wherein $\overline{R}$, $\overline{G}$, and $\overline{B}$ each represent a corresponding pixel color channel value from the background image;

determining an overall relative difference ($\Delta$) from the $\rho_R$, $\rho_G$, and $\rho_B$ values;

classifying the first pixel as depicting scene background when the overall relative difference ($\Delta$) is above or equal to the threshold assigned to the first pixel; and classifying the first pixel as depicting scene foreground when the overall relative difference ($\Delta$) is below the threshold assigned to the first pixel.

21. The system of claim 20, wherein the overall relative difference ($\Delta$) for the first pixel is calculated from the $\rho_R$, $\rho_G$, and $\rho_B$ values according to:

$$\Delta = \frac{1}{2}\{\rho_R + \rho_G + \rho_B - \text{minimum}(\rho_R, \rho_G, \rho_B)\}.$$

22. The system of claim 17, wherein the operation further comprises:

classifying one or more of the pixels in the group as being an SIC candidate pixel by evaluating a spatial neighborhood of each pixel in the group, wherein the spatial neighborhood comprises a 3×3 grid of pixels with the pixel being evaluated at the center of the 3×3 grid.

23. The system of claim 22, wherein determining that the group of pixels in the first frame were classified as depicting scene foreground as the result of the sudden illumination change (SIC) comprises, determining that a majority of pixels in the group are classified as SIC candidate pixels, based on the evaluations of the spatial neighborhoods of the pixels in the group.

24. The system of claim 17, wherein the pixel values in the background image corresponding to the group of pixels are updated according to the following:

$$bg_r = \alpha(bg_r) + (1-\alpha)(\text{raw}_r) \quad bg_g = \alpha(bg_g) + (1-\alpha)(\text{raw}_g)$$
$$bg_b = \alpha(bg_b) + (1-\alpha)(\text{raw}_b)$$

wherein $bg_r$, $bg_g$, and $bg_b$ represent color channel values for a respective pixel in the background image, $\text{raw}_r$, $\text{raw}_g$, and $\text{raw}_b$ represent the R, G, and B color channels values for the corresponding color channel values in a current frame, and wherein $\alpha$ represents a value selected from a range of [0,1], inclusive.

* * * * *

UNITED STATES PATENT AND TRADEMARK OFFICE
CERTIFICATE OF CORRECTION

PATENT NO. : 8,285,046 B2  Page 1 of 1
APPLICATION NO. : 12/388409
DATED : October 9, 2012
INVENTOR(S) : Cobb et al.

It is certified that error appears in the above-identified patent and that said Letters Patent is hereby corrected as shown below:

In the Specifications:

Column 13, Line 66, please delete "a" and insert -- α -- therefor;

Column 14, Line 3, please delete "a" and insert -- α -- therefor;

Column 16, Line 41, please delete " $\bar{B}$ and $\bar{C}$ " and insert -- $\bar{K}$ and $\bar{G}$ -- therefor;

Column 17, Line 58, please delete "To" and insert -- $T_0$ -- therefor.

Signed and Sealed this
Twenty-first Day of May, 2013

Teresa Stanek Rea
*Acting Director of the United States Patent and Trademark Office*